United States Patent [19]
Heath et al.

[11] Patent Number: 5,553,239
[45] Date of Patent: Sep. 3, 1996

[54] MANAGEMENT FACILITY FOR SERVER ENTRY AND APPLICATION UTILIZATION IN A MULTI-NODE SERVER CONFIGURATION

[75] Inventors: David M. Heath, Nashua, N.H.; Michael F. Kraley, Lexington; Sangam Pant, Winchester, both of Mass.

[73] Assignee: AT&T Corporation, Basking Ridge, N.J.

[21] Appl. No.: 337,943

[22] Filed: Nov. 10, 1994

[51] Int. Cl.⁶ .................................................. G06F 11/34
[52] U.S. Cl. .............................. 395/187.01; 395/200.12; 380/25
[58] Field of Search ............................ 395/575, 325, 395/725, 275, 800, 187.01, 186, 188.01, 187, 200.01, 200.02, 200.12, 200, 821, 840, 856, 892, 280; 364/238.3, 228.3, 242.94, 286.4, 286.5; 380/4, 25

[56] References Cited

U.S. PATENT DOCUMENTS

| | | | |
|---|---|---|---|
| 4,672,572 | 6/1987 | Alsberg | 364/900 |
| 4,754,395 | 8/1988 | Weisshaar et al. | 364/200 |
| 4,780,821 | 10/1988 | Crossley | 340/825.3 |
| 4,799,153 | 1/1989 | Hann et al. | 380/25 |
| 4,835,685 | 5/1989 | Kun | 364/200 |
| 4,924,378 | 5/1990 | Hershey et al. | 364/200 |
| 5,023,907 | 6/1991 | Johnson et al. | 380/4 |
| 5,058,000 | 10/1991 | Cox et al. | 364/239.3 |
| 5,113,499 | 5/1992 | Ankney et al. | 395/325 |
| 5,175,852 | 12/1992 | Johnson et al. | 395/600 |
| 5,226,172 | 7/1993 | Seymour et al. | 395/800 |
| 5,257,384 | 10/1993 | Farrand et al. | 395/725 |
| 5,280,581 | 1/1994 | Bathrick et al. | 395/286.5 |
| 5,297,262 | 3/1994 | Cox et al. | 395/325 |
| 5,313,637 | 5/1994 | Rose | 395/725 |
| 5,373,243 | 12/1994 | Parzych et al. | 395/725 |

*Primary Examiner*—Robert W. Beausoliel, Jr.
*Assistant Examiner*—Albert Decady
*Attorney, Agent, or Firm*—Cesari and McKenna

[57] ABSTRACT

Disclosed is a server architecture for connecting to a plurality of remote client computers each seeking access to applications resident on the server. The architecture provides (1) a reliable, single point of entry for client users that enforces security and recovers immediately from failures; (2) connection management that monitors the user's level of online activity, terminating inactive connections both to save system resources and to limit unnecessary connection charges to the user; (3) application management that spreads users optimally among active application instances, maintaining a pool of available applications, initiating new instances when the pool is low, and which records a user's utilization of different applications for billing purposes; (4) system integrity, which is achieved through division of transaction-management responsibility among the various interrelated components of the invention; and (5) continuous, uninterrupted operation. The invention distributes tasks to different functional modules in a manner that promotes efficiency and ready accommodation of large numbers of users without processing delays.

21 Claims, 5 Drawing Sheets

MANAGEMENT FACILITY FOR SERVER ENTRY AND APPLICATION UTILIZATION IN A MULTI-NODE SERVER CONFIGURATION

FIELD OF THE INVENTION

This invention relates to client/server computational architectures, and in particular to managing client connections and utilization of server-based applications in an online service environment.

BACKGROUND OF THE INVENTION

Online computer services are large regional or national networks accessible to consumers by subscription. Providers offer their subscribers a wide range of services, including on-demand access to electronically represented newspapers, software and documents that can be "downloaded" at the user's request; discussion groups in which subscribers can take part by computer; electronic mail among subscribers and non-subscribers; and various forms of entertainment. Generally, consumers connect to a service via telephone, and the service charges its subscribers a recurring fee for its basic service package and/or a variable fee for the time they are actually connected.

Online services have experienced an enormous increase in their customer bases in the last few years, owing both to the proliferation and growing sophistication of personal computers as well as to the expansion of available services. The need to provide a large, widely dispersed user group with on-demand access to the central online service requires substantial computational capability. The service must not only control and monitor user access, but must also maintain a large, constantly growing reservoir of information to which many users must have simultaneous access.

One widely accepted computer architecture, developed specifically to accommodate the "distributed computing" environments that characterize online services, is the client-server model. In its purest form, a client-server system consists of a central server (sometimes called the host), which is a very powerful computer (or cluster of computers that behaves as a single computer) that services the requests of a large number of smaller computers, or clients, that connect to it. The client computers never communicate with one another, instead exchanging data only with the server, which thereby acts a clearinghouse for client requests and inter-client communications. A server, therefore, may be a large mainframe or minicomputer cluster, while the clients may be simple personal computers.

Although they need not be powerful, it is nonetheless important that clients possess a basic level of on-board processing capability; unlike older timeshare systems, which utilized "dumb" terminals that were essentially driven by the central machine, the client-server model requires that each client be capable of independent computational operation. In this way, the central server need only accept and deliver messages to the clients, which process them for output to the user. This approach limits the processing burden on the server and facilitates faster, readily customized responses by the clients.

An exemplary client-server configuration is illustrated in FIG. 1. A central server 10 communicates with a series of client computers $12_1, 12_2, 12_3, 12_4 \ldots 12_n$ over a coextensive series of physical connections $14_1, 14_2, 14_3, 14_4 \ldots 14_n$. The terms "server" and "host" are herein used interchangeably to denote a central facility consisting of a single computer or group of computers that behave as a single unit with respect to the clients. In order to ensure proper routing of messages between the server and the intended client, the messages are first broken up into data packets, each of which receives a destination address according to a consistent protocol, and which are reassembled upon receipt by the target computer. A commonly accepted set of protocols for this purpose are the Internet Protocol, or IP, which dictates routing information; the Transmission control protocol, or TCP, according to which messages are actually broken up into IP packets for transmission for subsequent collection and reassembly; and User Datagram Protocol, or UDP, for "broadcast-style" packet transmissions. TCP/IP connections are quite commonly employed to move data across telephone lines, and have been adopted not only by online services but throughout the worldwide, integrated network communication web known as the Internet.

The Internet contains vast stores of technical and academic information, but much of this is formatted as undifferentiated text, and requires mastery of a difficult command vocabulary to access effectively. The information provided by online services, in contrast, is readily accessible without special training, tailored in content to the interests of subscribers, and presented in a visually appealing fashion. Online services typically offer their subscribers access to the Internet as well, once again in a format designed to promote easier identification and retrieval of information.

Ordinarily, users access online services by logging onto the online server and requesting them (e.g., by simply "clicking" on a title or icon with a position-sensing mouse, or otherwise designating a particular service). Each service is typically implemented by an application resident and executable, at least in part, on the server. In this sense, the term "application" denotes a body of functionality for obtaining, processing and/or presenting data to a user. For example, electronic mail (e-mail) facilities allow the user to send and receive memo-type communications; document browsers display hierarchically organized collections of document titles, any of which can be obtained by a user. Applications can be "active," operating only when affirmatively engaged by a user, or maintain a "background" task mode, which operates even when the application is not active.

Because access to these applications is valuable, the server must be provided with security features that prevent unauthorized connections. Furthermore, service providers may offer various different levels of service; in such arrangements, subscribers to more expensive, high-level packages are accorded access to applications that subscribers with lower privilege levels cannot access (at least without payment of an additional fee). Accordingly, security measures must operate not only at the entry level, but at the application level as well.

In a similar vein, service providers may charge a user on a per-application basis based on the time the user is actually connected to the various applications; the unit charge can vary depending on the user's privilege level. Thus, the issues of security and proper billing are intimately related.

Once a user successfully logs onto the server, he expects that his connection—both to the server itself and to all selected applications—will be maintained for the duration of his session. Because of the large number of remote users and the even more numerous applications running simultaneously, maintaining overall system integrity, as experienced by individual users, represents a complex endeavor. Even on well-designed multitasking computer systems, operational malfunctions originating with a single application can result in general faults that cause other applications to fail. The potential for mishap may be magnified on multinode computer systems, where the greater number of simultaneously operating computers presents a greater statistical likelihood of failure by one of them. Since the mechanical and electrical reliability of a computer can be ensured only within technological limits, the software that implements the online service network must be designed in a manner tolerant to fault if users are to be kept satisfied.

One source of application "crashes" is overutilization. Although most server applications can accommodate multiple simultaneous users, most also have a maximum number that can be concurrently serviced in a reliable manner, and many have an optimal limit falling somewhere short of the maximum. If the server architecture establishes too many circuits to a single application "instance"—that is, a single, independently running version of the application—instead of creating new instances to diffuse the computational load, the risk of application failure increases and performance (e.g., response time) decreases. On the other hand, because each application instance consumes computational resources (or "overhead"), excessive instances, without pruning to reflect decreased usage, will needlessly diminish overall system performance. A robust server architecture, therefore, should react to user demand by starting new application instances when necessary, but also close instances when they are no longer needed. The same is true of connections, both physical and logical. If the user departs from his client machine for an excessive period, maintenance of the physical connection wastes computational overhead and telecommunication resources; if the user quits an application, maintenance of the logical connection until the user signs off completely represents an analogous waste.

SUMMARY OF THE INVENTION

The present invention provides an architecture offering (1) a reliable, single point of entry for client users that enforces security and recovers immediately from failures; (2) connection management that monitors the user's level of online activity, terminating inactive connections both to save system resources and to limit unnecessary connection charges to the user; (3) application management that spreads users optimally among active application instances, maintaining a pool of available applications, initiating new instances when the pool is low, and which records a user's utilization of different applications for billing purposes; (4) system integrity, which is achieved through division of transaction-management responsibility among the various interrelated components of the invention; and (5) continuous, uninterrupted operation. The general approach of the invention is to distribute tasks to different functional modules in a manner that promotes efficiency and ready accommodation of large numbers of users without processing delays.

The system of the present invention includes, first, a communication platform for establishing and maintaining physical telecommunication connections between the host and a plurality of clients. Each physical connection is capable of supporting multiple logical connections, which are implemented and monitored by the various modules herein described.

User access to the system is controlled by an entry manager, which becomes operative after receiving a UDP message from the client. The entry manager, which is implemented in a master-slave configuration that ensures reliable, continuous operation, obtains sufficient information from the newly connected client to facilitate telecommunication connection thereto. The entry manager then causes another module, called a process server, to establish a TCP/IP connection using the original physical telecommunication connection and await receipt of a valid password and a valid user name, If none is received after a predetermined period of time, or after a fixed number of attempts, the process server terminates the connection.

Assuming the client validly identifies itself to the process server, the latter module receives requests for connection to applications resident on the host. The process server, preferably in conjunction with another module called an application manager, then instructs each requested application to establish a logical connection (i.e., a new TCP/IP connection) with the client over the physical telecommunication connection. The process server keeps track of these application-to-client logical connections and their durations for billing purposes, and terminates the physical connection if too much time passes without user activity.

The process server also determines the optimal instance of each requested application to which the client should be connected. In particular, the process server identifies any currently running instances of the requested application and, if it detects any such instances, determines the maximum number of clients that may be logically connected to each instance. Assuming more than one running application instance has more than one free slot, the process server selects, for connection to the client, the most recently used instance. The process server informs the application manager of the application instance to which the client should be connected. The application manager then instructs the application to establish a logical connection to the client, and determines whether new instances of the application should be started to maintain the free pool. If so, the application manager starts new instances as necessary.

Once instructed to connect, the applications maintain logical connections between themselves and the client. This effectively frees the entry manager, process servers and application managers to support connectivity issues only.

The modules of the invention are organized in a manner that provides smooth operation on servers organizes as clusters. As used herein, a "cluster" refers to a group of linked computers, or "nodes," that share a common mass storage device (generally a group of hard disks); the storage device appears local to each node even though it is actually a shared resource. A suitable operating system synchronizes access to file space on the storage device in a manner that resolves contention and avoids simultaneous data alterations.

BRIEF DESCRIPTION OF THE DRAWINGS

The foregoing discussion will be understood more readily from the following detailed description of the invention, when taken in conjunction with the accompanying drawings, in which.

DESCRIPTION OF THE PREFERRED EMBODIMENT

Figure 1:
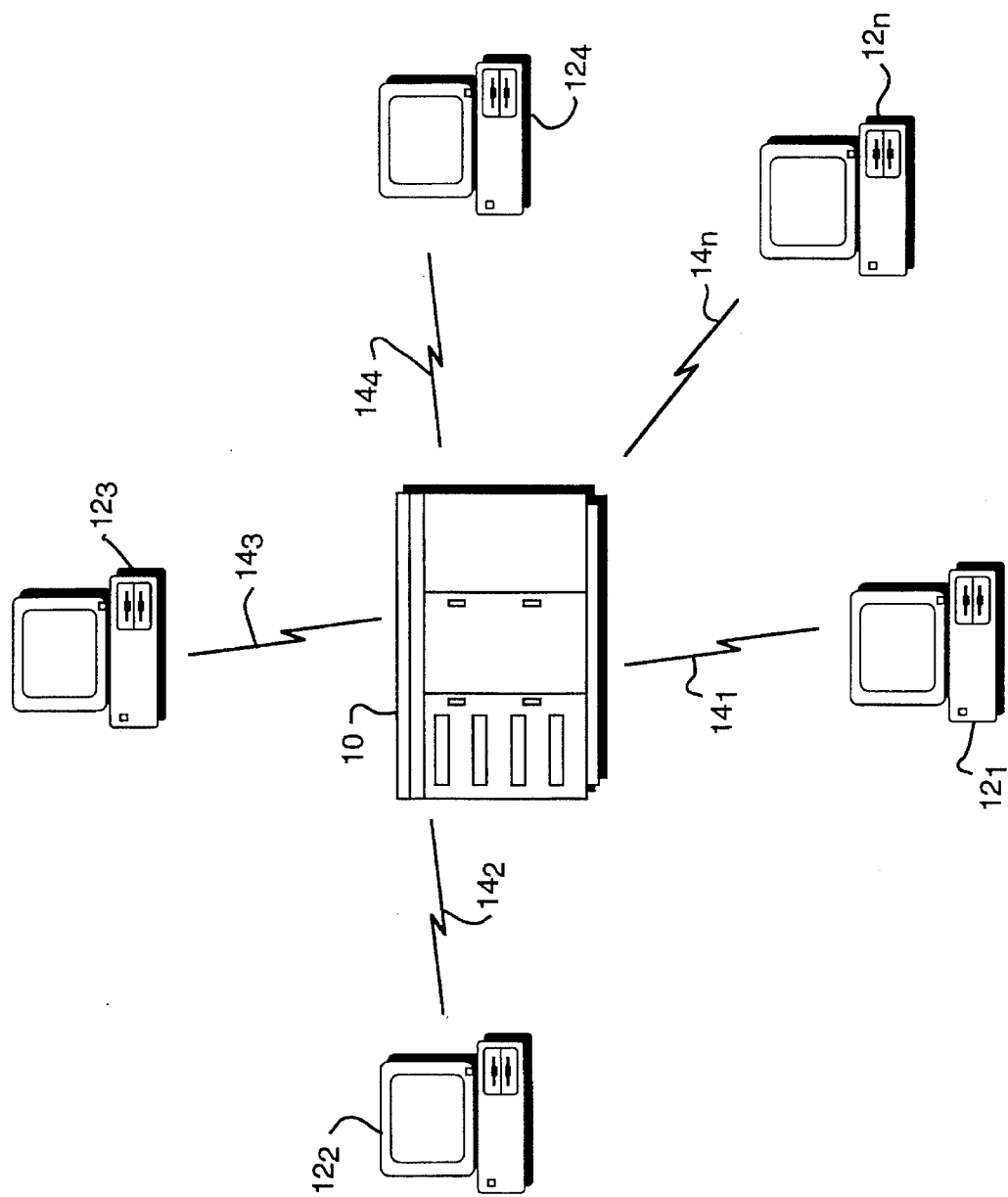
FIG. 1 schematically illustrates a simplified client-server arrangement.
Figure 2:
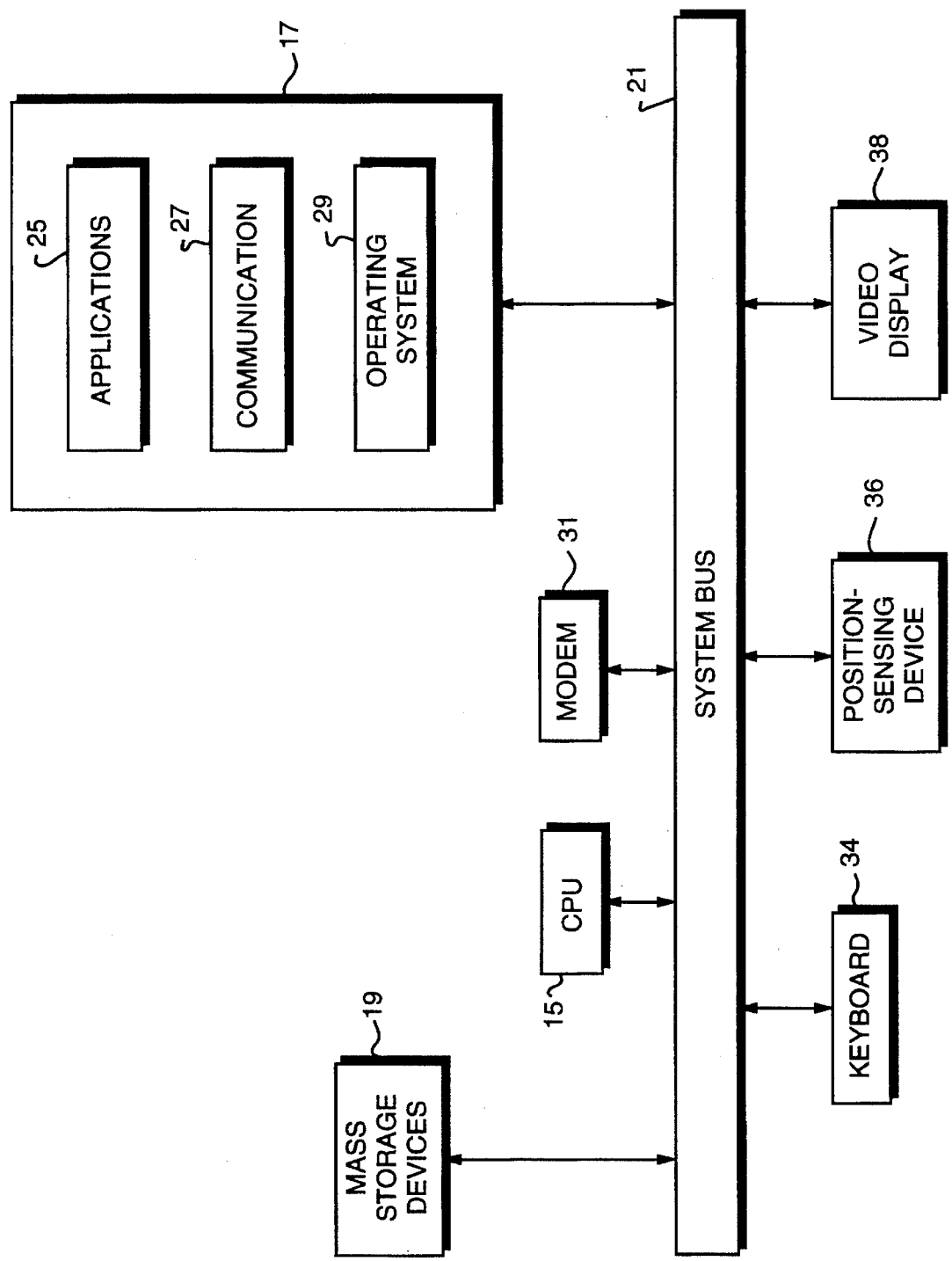
FIG. 2 schematically illustrates the components and operation of a computer system serving either as host or client.

Refer first to FIG. 2, which illustrates generic computer circuitry representative both of clients and servers. The depicted computer system includes a central-processing unit 15, which performs operations on and interacts with a main system memory 17 and components thereof. System memory 17 typically includes volatile or random-access memory (RAM) for temporary storage of information, buffers, and portions of the computer's basic operating system. The system also includes at least one mass storage device 19, such as a hard disk and/or CD-ROM drive. All components of the system communicate over a bidirectional system bus 21.

While clients and servers bear similar hardware configurations at this level of generality, their relative processing and data-storage capabilities are naturally quite different. A client may be, for example, a personal computer running the Windows graphical user interface supplied by Microsoft Corp., while the server is, in the context of the present invention, some type of mainframe or minicomputer cluster running several multi-platter hard drives and/or optical storage components as mass storage device 19.

System memory 17 contains, during operation, a series of applications 25 appropriate to the role the computer 10 is to play in the client-server system, a communication module 27 (preferably implementing TCP/IP) capable of transferring data among machines, and an operating system or graphical user interface 29. Communication module 27 drives a modem 31 or other data-transmission circuitry to transfer streams of digitally encoded data over telephone or other communication lines.

The user interacts with the system using a keyboard 34 and a position-sensing device (e.g., a mouse). The output of either device can be employed to designate information or select particular areas of a video screen display 38, over which the user observes the state of the system or, in the case of a subscriber, views requested information. Ordinarily, interactions between the user and applications 25 are managed through a suitable graphical user interface appearing on display 34.

Figure 3:
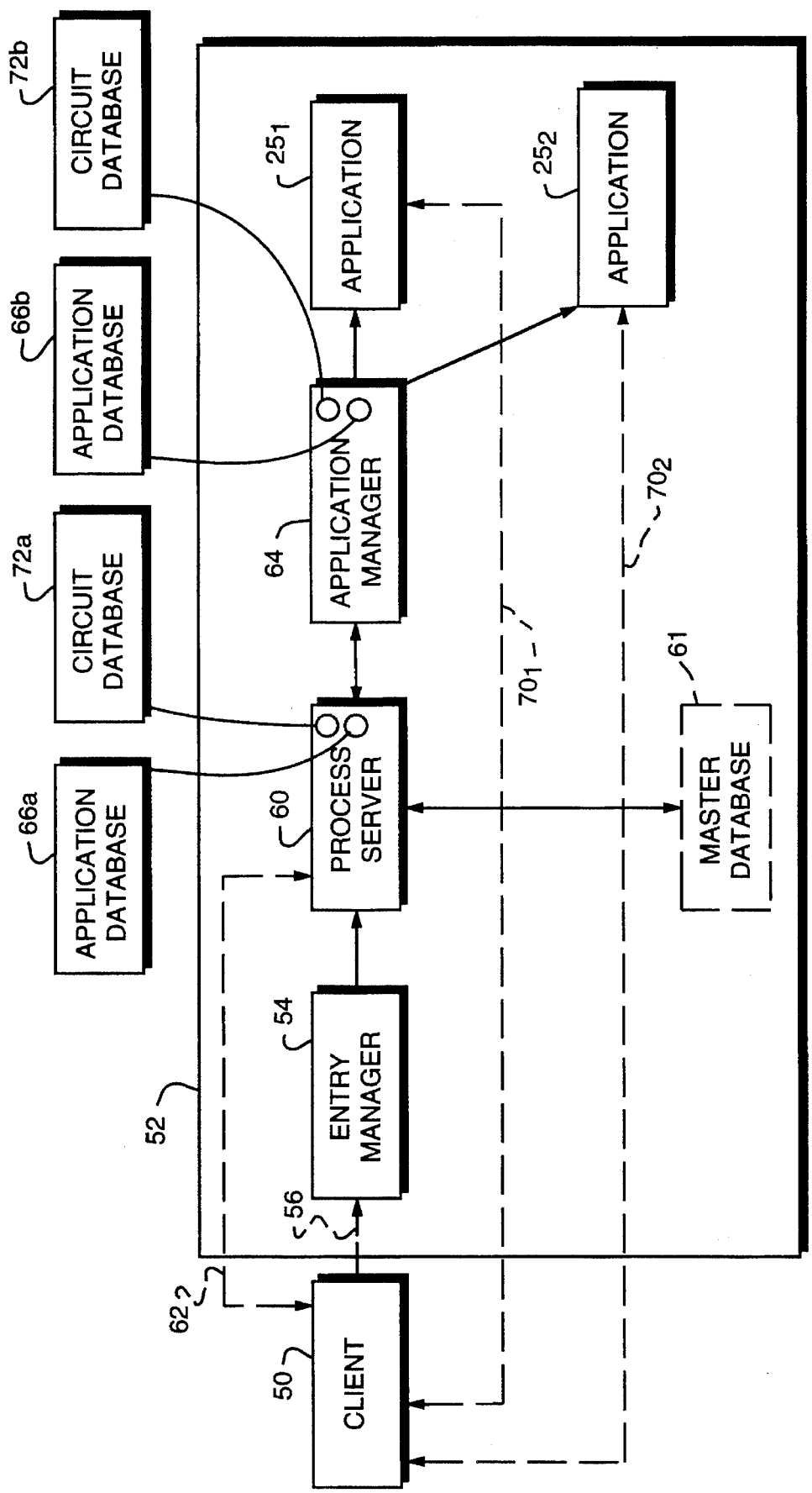
FIG. 3 schematically illustrates the components of the present invention as they interact with a single client computer.

The present invention, whose components preferably reside on the server as functional software modules stored in system memory 17, mediates between subscribers' client computers the server. FIG. 3 illustrates the operation of the invention from the perspective of a single client computer 50 that communicates and interacts with applications resident on a single-machine server 52; a system-wide perspective in a multi-node server implementation appears in FIG. 4, and is discussed below. With reference to FIG. 3, the communication module of the client 50 initiates contact with the server 52 by sending a UDP initiation message to an entry manager 54 over a physical telecommunication circuit (e.g., a telephone line connection) 56. Entry manager 54 serves as a single point of entry for all users. Specifically, entry manager 54 obtains from client 50, over telecommunication circuit 56, sufficient information to enable server 52 to establish new TCP/IP connection 62 to client 50 on its own initiation. This information may be stored in a data structure, accessible to entry manager 54 over connection 56, in the client's memory 17. As soon as it obtains this information, entry manager 54 instructs a process server 60 to establish a new one over the existing physical connection 56. Moreover, this arrangement lends itself to ready scaling in order to accommodate large numbers of clients. Because entry manager 54 performs only a brief data-acquisition function, it is possible even a single entry manager, functioning on a single machine, can serve large numbers of clients. In addition, the capacity of entry manager 54 can be further expanded by implementing the system on a computer network and routing the TCP/IP connections into the network rather than to a specific network node; in this way, logical connections to clients can be established by any available node on the network (rather than from the specific machine on which entry manager 54 is resident).

An alternative to the above-described UDP approach is to have entry manager 54 establish a logical TCP/IP connection with client 50, save the information necessary to re-establish this connection, break the connection, and instruct process server 60 to establish a new TCP/IP connection based on the stored information.

After process server 60 connects logically to client 50, it awaits a user-name identifier and a password, which it checks for validity against a master database 61 resident on a mass storage device 19 of server 52. (To enhance security even further, process server 60 can be configured to check for additional identification data in the client's data structure, comparing stored information regarding the client computer, for example, against actual physical characteristics discernible over connection 62.)

Following establishment of connection 62, process server 60 manages the physical telecommunication connection 56 and handles client requests for access to applications 25. These requests include the identifier of the application or applications, representatively denoted by reference numerals $25_1$, $25_2$, to which client 25 desires access. In response, process server 60 first checks the subscriber privilege level associated with the client (which is preferably stored on master database 61) to determine whether each request is legitimate. If so, process server 60 directs an associated application manager 64—each process server 60 communicates with at most a single application manager on each node of the server, as discussed below—to instruct the optimal instance of the requested application to establish a logical connection $70_1$, $70_2$, or circuit, between client 50 and the requested application over physical connection 56.

To identify the optimal application instance, process server 60 maintains, in an associated memory partition 66a, an application database, each record of which lists the application name, its nodal location, its type (i.e., the functions it performs), an optimal limit on the number of users logically connected to the application, and a maximum number of users the application can handle (i.e., the number of available user slots). To facilitate dynamic real-time recovery in the event of malfunction, a similar database 66b is maintained by application manager 64. Process server 60 first locates the record in database 66a corresponding to the requested application, and determines whether one or more instances of that application are presently running. If so, process server 60 determines which of these can best support an additional user, and directs application manager 64 to instruct that application to establish a logical connection $70_1$, $70_2$ between itself and client 50; this approach minimizes the number of application instances active at any one time, since underutilized instances will shut down when the last user quits. In addition, application manager 64 can be configured to monitor the total number of available user slots for all instances of the application and the rate at which these are being depleted, enabling it to anticipate the need for another instance of the application and start it before that need actually arises; this avoids the start-up delays that would otherwise be experienced by clients.

Process server 60 maintains a record of each circuit established by application manager 64 in a circuit database 72a, which resides in a partition of main memory 17; once again, for ease of recovery, application manager maintains a similar database 72b. Each circuit record includes the identifier of the application and the overall duration of the logical connection.

If no instances of the requested application are currently running on server 52, or if all running applications have more users than are optimal, application manager 64 determines whether an application of the same type (i.e., providing the same functions) as the requested application is running, and once again, whether any open slots are available. If a same-type application is not available, or if the number of users on such an application exceeds the optimal or maximum number, application manager 64, by means of operating system 29, starts another instance of the requested application.

When the client quits an application, the circuit is terminated and its duration noted in circuit databases 72a, 72b. The application passes a message to application manager 64, notifying it of the circuit termination; application manager 64 then determines whether the application has any active circuits associated with it; if not, application manager 64 determines if the pool of available applications exceeds that necessary for effective operation, and if so, closes the application.

This configuration renders the system highly resilient in the event of a single-point failure, such as an application malfunction or crash. In the preferred OpenVMS implementation discussed below, the OpenVMS operating system isolates active applications from one another such that the crash of one, or its elimination by the application manager or the system operator, will not affect operation of the others. If an application manager becomes inoperative before client 50 is logically connected to an application, or if malfunction of the application manager somehow disrupts the functioning of an application, the existence of circuit database 72a enables process server 60 to re-establish any lost circuits by making a new call to the application manager after its functioning has been restored. If entry manager 54 becomes inoperative, its failure will not disrupt any already-established connections, since these are associated with individual process servers 60.

Since each process server 60 maintains the physical connection 56 to its associated user, it is able to break this connection if appropriate. In the preferred embodiment, process server 60 is configured to transmit, over connection 62, periodic "keep-alive" messages to client 50 to assess indicate continued activity; upon receiving a keep-alive message, client 50, if active, returns an "echo" message. Process server 60 is configured to break connection 56 if excessive time passes between transmission and echo of keep-alive messages, thereby avoiding the unnecessary server overhead associated with maintenance of unused or idle client connections,. Preferably, if process server 60 is programmed to generate a keep-alive message every n seconds, it will break connection 56 if it fails to receive an echo message after 2n seconds following the previous message. A typical value for n is 60. Circuit database 72a also enables process server 60 to terminate the internal circuits associated with connection 56, freeing user slots on the associated applications. Process server 60 accomplishes this by consulting database 72a to identify each application associated with the idle client, then sending messages to the appropriate application managers which, in turn, instruct the appropriate applications to break their circuits with the client.

Figure 4:
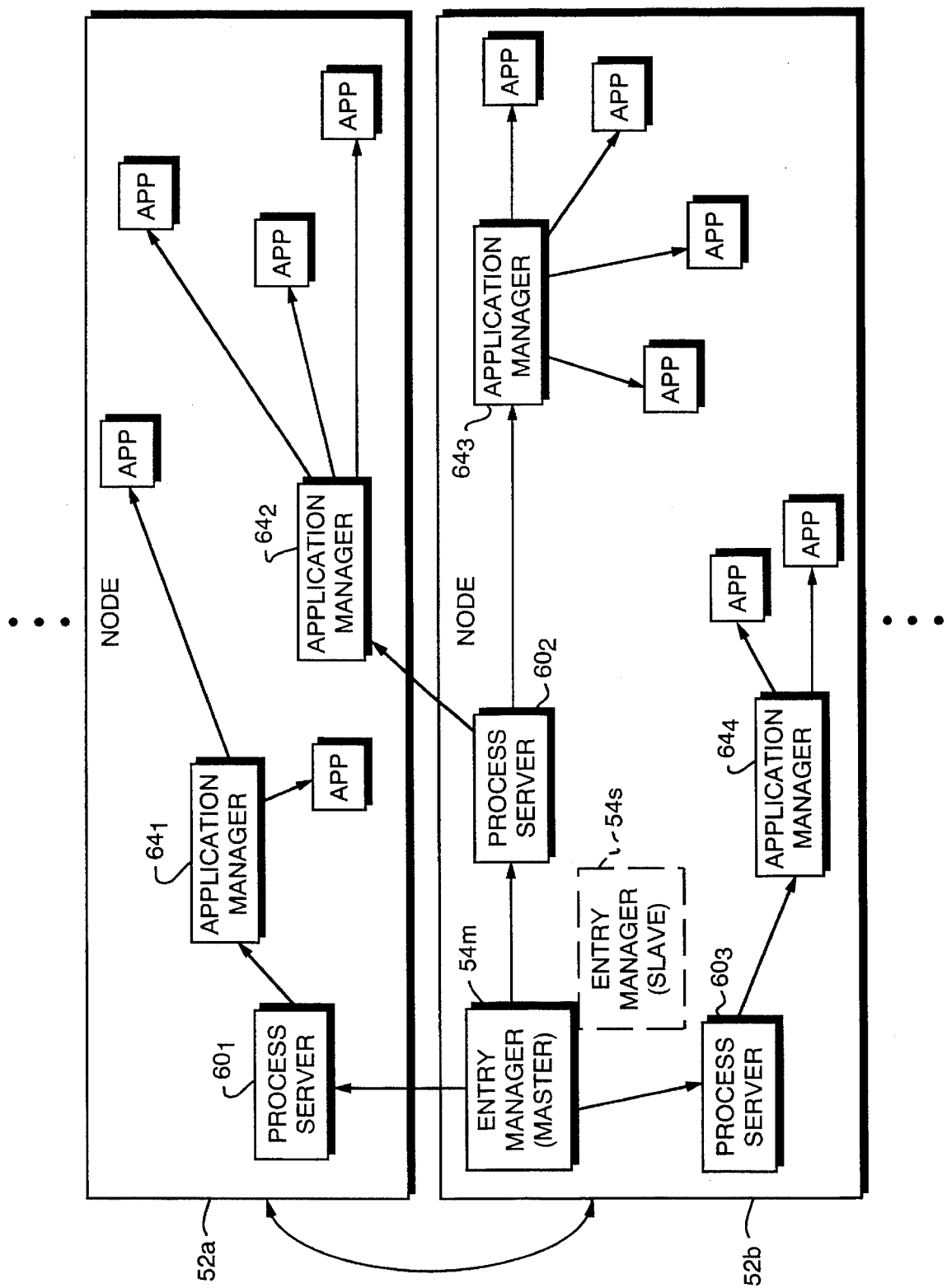
FIG. 4 schematically illustrates the components of the present invention as they interact throughout a representative, multi-node system.

Refer now to FIG. 4, which illustrates the components of the present invention and their operation in a multi-node computer environment. This environment is preferably a VAX cluster running the OpenVMS operating system (supplied by Digital Equipment Corp.), as indicated above, but the invention is useful in conjunction with single- or multi-node system designed to serve numerous online-service subscribers. The illustrated system includes a plurality of independent but interlinked minicomputer nodes, representatively indicated by reference numerals 52a, 52b. These nodes communicate with one another, and to clients behave as a single machine, in a manner well-known to those familiar with the art.

In the illustrated embodiment, entry manager 54 is implemented in a master-slave pairwise configuration to enhance reliability. Only the master entry manager 54m is actually operative at a given time. The slave entry manager 54s remains running at all times, however, so that failure of master 54m results in immediate default to slave 54s. The availability of a slave entry manager is particularly important in the preferred embodiment, where a single entry manager serves the entire host cluster. To implement this approach, entry managers 54m, 54s run as separate instances (on the OpenVMS operating system, each new instance represents a new OpenVMS process). Both entry managers are operatively coupled to communication module 27, but only entry manager 54m actually receives messages. Entry manager 54s monitors entry manager 54m and communication module 27 to ensure that entry manager 54m properly responds to client telecommunication connections established by module 27. In the event that entry manager 54m fails to respond, entry manager 54s assumes that the master is inoperative. Entry manager 54s then declares itself the master, and spawns a new slave.

Specific details of master-slave interaction in the preferred OpenVMS platform are given below. More generally, this type of hierarchical relationship with replicative capability is straightforwardly implemented using programming techniques available and commonly used in timesharing systems such as OpenVMS. In an such a system, the entry manager (that is, the member functions performed by the entry manager, including the ability to alter hierarchical identity and to replicate) is represented as a process, two instances of which are initially created by operating system 29. One of these (the master) has the operative entry-manager functions enabled, while the other has the monitoring, identity-alteration and replication capabilities enabled (the latter two functions being triggerable by detection of the master's failure).

Each process server $60_1$, $60_2$, $60_3$ is associated with up to a single application manager on each node of the server. Each application manager is associated with a single process server. Thus, for example, process server $60_2$ communicates with a single application manager $64_2$, $64_3$ on each of nodes 52a and 52b, while these application managers respond only to process server $60_2$. Each process server interacts with multiple clients over individual physical connections maintained with each such client (via communication module 27).

The functions performed by the process server—database maintenance, message and instruction passing to application managers, and connection supervision based on well-defined criteria—lend themselves not only to straightforward implementation, but also to accommodation of relatively large numbers of client-users (on the order of 100 or more in the OpenVMS implementation discussed below). Process servers and application managers, therefore, are preferably resident in system memory upon initialization. Applications, in contrast, by virtue of their system role are more numerous, and are therefore created only as needed.

An application manager has access only to those applications it has started. As shown in FIG. 4, different application managers do not have overlapping access to the same applications. Nonetheless, because a single process server (and therefore, a single application manager) can service multiple client-users, a single application instance will frequently be used simultaneously by more than one client (in the manner discussed above).

An exemplary implementation of the present invention utilizes the OpenVMS system operating on a VAX cluster. In VMS terminology, a "process" refers to a schedulable entity, and consists of an address space, distinct from the address spaces of other processes, that contains instructions and data. The OpenVMS operating system runs a program by loading it into the address space corresponding to an individual process. Keeping the various processes in physically distinct areas of memory ensures that malfunction of one running process will not disrupt execution of other processes.

The OpenVMS system utilizes a number of functions that facilitate interprocess communications and synchronize access to the common mass storage device. One communication function is the VMS mailbox, which allows a process to deposit a message or data into an address space accessible by other processes; any of these can access the mailbox and thereby obtain the stored items. An important synchronization function is the Distributed Lock Manager ("DLM"), which allows a process to restrict access to a common resource (most often a designated address range within a hard disk), thereby protecting a transaction from interference from other, concurrently executing transactions. A "lock" can be exclusive, meaning that only the process that has requested and been accorded the lock by the OpenVMS operating system can read or write to the locked resource, or can accord shared access among applications; for example, a process can request a write lock, which forbids other applications from writing onto the resource, but which permits them to read resource data. When the process that obtained the lock no longer needs priority access to the locked resource, it notifies the OpenVMS operating system, which releases the lock and frees the resource for common use once again. Associated with each lock resource is a small data area called a lock value block. The information in this block can be used to efficiently transfer information between cooperating processes. The locks span the entire cluster and are therefore ideal for use as an interprocess communication mechanism. A process can also store information in a lock, so that if another process obtains the lock after its release, the other process will also gain access to the stored information.

The present invention utilizes the mailbox and locks for both synchronization and communication. Coordination between master and slave entry managers is accomplished using locks, which facilitate role-switching upon failure of the master. Specifically, an operator starts two entry-manager instances, both of which immediately access a named global memory space and request a particular, named lock in Exclusive Mode from the OpenVMS operating system. The instance that first requests the lock receives it, and becomes the master; the other instance becomes the slave. (Alternatively, an operator can start a single entry-manager instance configured to start a slave instance once it obtains the lock.) Upon an entry manager's creation or redesignation as the master, it first checks the global memory for a special signature indicating that the memory has been initialized (e.g., by an earlier master that has malfunctioned); if the signature is not present, the master instructs the operating system to initialize the memory, and then adds the appropriate signature.

As the master is running, it periodically stores the current time in a system memory location accessible to the slave. The slave repeatedly requests the lock. If the operating system gives the lock to the slave, the master has malfunctioned; upon obtaining the lock, the slave redesignates itself as the master, and generates a new slave by replicating itself. Each time the slave unsuccessfully requests the lock, it checks the timestamp most recently stored by the master. If the timestamp is older than a predetermined time (preferably, about two minutes), the slave assumes that the master has frozen. The slave then either sends an urgent message to the the system operator or, if desired, may instead be configured to redesignate itself as the master as if the frozen master had crashed. This approach ensures continuity of the entry manager function by causing replacement of a master that has fully crashed (in which case the lock will be available) or replacement (or immediate repair) of a master that is performing sluggishly.

Figure 5:
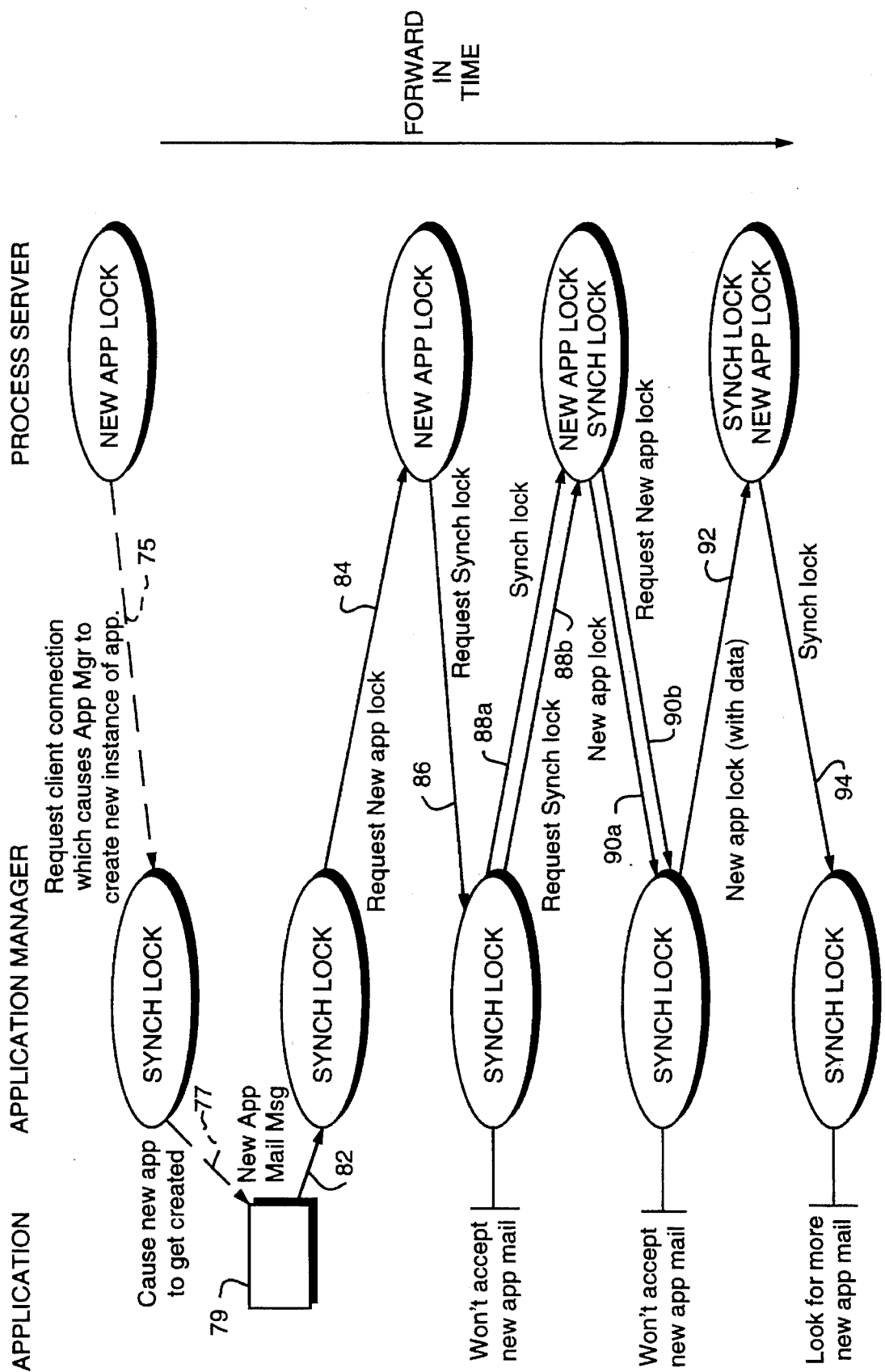
FIG. 5 schematically illustrates implementation of the invention in an OpenVMS computational environment.

FIG. 5 illustrates the manner in which locks and the mailbox perform signaling and transaction-management functions in implementing the activities of a process server and one of its associated application managers. Pairs of locks are used to avoid contention and loss of data (since the application manager and the process server can reside on different nodes). In an initial step 75, the process server, which holds the lock called "New app lock," requests the application manager, which holds the lock called "Synch lock," to start an application. The application manager ("App Mgr") does so, in the manner discussed above, at step 77. When operative, the application ("New App") 79 places a message in a mailbox indicating that it is on line. The application manager reads this message at step 82, causing it to issue a request, at step 84, to the operating system for New app lock, which is currently held by the process server; the operating system informs the process server of this request. (The arrow representing step 84 is not intended to suggest that the request is routed directly to the process server without the intervention of the operating system.)

Rather than give up New app lock, the process server requests Synch lock, which is held by the application manager, at step 86. Upon being informed by the operating system of this request, the application manager releases Synch lock, effectively sending it to the process server at step 88a. Immediately thereafter, at step 88b, the application manager requests Synch lock back again. When it receives Synch lock, the process server releases New app lock in step 90a, immediately requesting it back again at step 9b. When the application manager receives New app lock, it fills the lock with information regarding the new application. It then releases New app lock in step 92, effectively sending it to the process server, which stores the passed information regarding the application in circuit databases 72a, 72b. The process server then releases Synch lock in step 94, so that it returns to the application manager; both the application manager and the process server are now back in their original states, and the process server has obtained confirmation of application functioning and its connection to the client, as well as information identifying the new application.

This message-passing scheme, while requiring multiple steps, prevents loss of the transaction if either the application or the process server fails. The state of the locks effectively reflects the stepwise progress of the transaction, and failure to complete a step serves as a signal of transaction breakdown. This signal may be utilized by recovery routines embedded within each module (and executed by the module that has not failed).

It will therefore be seen that the foregoing represents a highly efficient and easily optimized approach to service of clients by a host computer. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed. For example, the various modules of the invention can be implemented on a general-purpose computer using appropriate software instructions, or as hardware circuits.

What is claimed is:

1. Apparatus for managing access to applications, resident on a central host computer, by a plurality of clients, the apparatus comprising:
   a. communication means for establishing and maintaining physical telecommunication connections between the host and a plurality of clients, each connection being capable of supporting a plurality of logical connections;
   b. a computer memory;
   c. an entry manager for controlling access to the host after establishment of a physical connection between a client and the host via the communication means by:
      i. obtaining sufficient information from the client to facilitate establishment of a logical connection thereto; and
      ii. storing the information in the computer memory; and
   d. a process server, operatively coupled to the entry manager, for:
      i. establishing a logical connection to the client using the stored information;
      ii. awaiting receipt of a valid password and a valid user name from the client;
      iii. receiving, from the client, at least one request for connection to an application resident on the host, the application being capable of supporting a plurality of logical connections;
      iv. causing establishment of a logical connection between each requested application and the client; and
      v. terminating the physical connection if a valid password and a valid user name are not received.

2. The apparatus of claim 1 further comprising a master database containing valid passwords and valid user names, and against which the process server checks, for validity, the password and the user name received from the client.

3. The apparatus of claim 2 wherein the master database further contains client privilege levels, and further wherein the process server determines, from the privilege level associated with the client, whether the client is entitled to access to the requested application.

4. The apparatus of claim 1 wherein the process server establishes the logical connection between the client and an instance of the requested application by:

a. identifying any currently running instances of the requested application;
   b. if any running instances are identified, determining:
      i. a maximum number of clients logically connectable to each running instance;
      ii. the number of clients currently logically connected to each running instance;
      iii. whether any running instances have a maximum number of logically connected clients that exceeds the number of currently logically connected clients; and if so,
   c. identifying an optimal running instance as that instance whose maximum number of logically connected clients least exceeds the number of currently logically connected clients;
   d. if no running instances are identified, causing a new instance of the requested application to be started; and
   e. establishing a logical connection between the client and the optimal running instance or the new instance.

5. The apparatus of claim 4 further comprising an application database associated with the process server, the application database containing, for each application executable on the server, a record comprising an application name, a server location, a type, an optimal limit on the number of users logically connected to the application, and a maximum limit on the number of users logically connected to the application.

6. The apparatus of claim 5 wherein the process server determines the maximum number of clients logically connected to each running instance by locating the database record corresponding thereto.

7. The apparatus of claim 1 wherein each logical connection has a duration and further comprising a circuit database associated with the process server, the circuit database containing, for each logical connection between an application and the client, an identifier corresponding to the application and the duration of the logical connection.

8. The apparatus of claim 1 wherein the process server sends keep-alive messages to the client, which, in response, sends echo messages back to the process server, and further wherein the process server terminates the physical connection if a predetermined time is exceeded between a keep-alive message and an echo message.

9. The apparatus of claim 4 further comprising an application manager, wherein the process server sends keep-alive messages to the client, which, in response, sends echo messages back to the process server, and further wherein, if a predetermined time is exceeded between keep-alive messages, the process server terminates the physical connection and the application manager terminates each logical connection between the connection and an application.

10. The apparatus of claim 8 wherein the predetermined time is one minute.

11. The apparatus of claim 9 wherein the predetermined time is one minute.

12. The apparatus of claim 1 wherein the entry manager comprises an active master entry manager and an inactive slave entry manager, the slave entry manager becoming active upon malfunction of the master entry manager.

13. The apparatus of claim 9 wherein the entry manager, process server and application manager reside on a server containing a plurality of nodes.

14. The apparatus of claim 13 wherein the apparatus contains a single active entry manager and each node contains a plurality of process servers and application managers, each process server being associated with a single application manager on any one node.

15. The apparatus of claim 13 wherein the system isolates instances of applications from one another.

16. The apparatus of claim 1 wherein the entry manager establishes a logical connection to the client in order to obtain the connection information, and breaks the logical connection after obtaining said information.

17. A method of managing access to applications, resident on a central host computer, by a plurality of clients, the method comprising the steps of:

a. establishing a physical telecommunication connection between the host and a client;

b. establishing a logical connection between the host and the client;

c. causing the host to await receipt of a valid password and a valid user name from the client;

d. causing the host to receive, from the client, at least one request for connection to an application resident on the host, the application being capable of supporting a plurality of logical connections;

e. causing establishment of a logical connection between each requested application and the client over the physical connection; and f. terminating the physical connection if a valid password and a valid user name are not received.

18. The method of claim 17 further comprising the step of determining a privilege level associated with the client and, based thereon, determining whether the client is entitled to access to the requested application.

19. The method of claim 17 further comprising the steps of:

a. identifying any currently running instances of the requested application;

b. if any running instances are identified, determining:
  i. a maximum number of clients logically connectable to each running instance;
  ii. the number of clients currently logically connected to each running instance;
  iii. whether any running instances have a maximum number of logically connected clients that exceeds the number of currently logically connected clients; and if so, c. identifying an optimal running instance as that instance whose maximum number of logically connected clients least exceeds the number of currently logically connected clients;

d. if no running instances are identified, starting a new instance of the application; and e. establishing a logical connection between the client and the optimal running instance or the new instance.

20. The method of claim 17 wherein the server sends keep-alive messages to the client, which, in response, sends echo messages back to the server, and further comprising the step of terminating the physical connection if a predetermined time is exceeded between a keep-alive message and an echo message.

21. The method of claim 20 wherein the predetermined time is one minute.

* * * * *